United States Patent
Imukai et al.

(10) Patent No.: US 8,451,115 B2
(45) Date of Patent: May 28, 2013

(54) SYSTEM AND METHOD FOR PREVENTING PORTABLE TERMINAL FROM BEING LEFT, AND PORTABLE TERMINAL

(75) Inventors: Takafumi Imukai, Minato (JP); Manabu Toyoda, Kawasaki (JP); Haruhi Morimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 679 days.

(21) Appl. No.: 12/732,854

(22) Filed: Mar. 26, 2010

(65) Prior Publication Data
US 2010/0176946 A1    Jul. 15, 2010

Related U.S. Application Data

(63) Continuation of application No. PCT/JP2007/001188, filed on Oct. 30, 2007.

(51) Int. Cl.
*G08B 1/08* (2006.01)

(52) U.S. Cl.
USPC ............ 340/539.21; 340/539.11; 340/539.23; 340/571

(58) Field of Classification Search
USPC ............... 340/539.1, 539.11, 539.21, 539.23, 340/571, 568.1
See application file for complete search history.

(56) References Cited

U.S. PATENT DOCUMENTS

| | | | |
|---|---|---|---|
| 7,061,385 B2 * | 6/2006 | Fong et al. ................. | 340/573.4 |
| 7,312,711 B2 * | 12/2007 | Fong et al. ................. | 340/573.4 |
| 7,535,369 B2 * | 5/2009 | Fong et al. ................. | 340/573.4 |
| 7,843,318 B2 * | 11/2010 | Funayose et al. ......... | 340/426.11 |
| 2005/0062604 A1 * | 3/2005 | Fong et al. ................. | 340/539.23 |
| 2006/0145883 A1 * | 7/2006 | Fong et al. ................. | 340/686.6 |
| 2007/0018799 A1 * | 1/2007 | Funayose et al. ......... | 340/426.11 |
| 2008/0061993 A1 * | 3/2008 | Fong et al. ................. | 340/573.4 |
| 2009/0303054 A1 * | 12/2009 | Fong et al. ................. | 340/573.4 |

FOREIGN PATENT DOCUMENTS

| | | |
|---|---|---|
| JP | 2002-159056 | 5/2002 |
| JP | 2005-333626 | 12/2005 |
| JP | 2006-20004 | 1/2006 |

* cited by examiner

*Primary Examiner* — Travis Hunnings
(74) *Attorney, Agent, or Firm* — Staas & Halsey LLP

(57) ABSTRACT

A system for preventing a portable terminal from being left is characterized in that the portable terminal sounds an alarm when a signal from a wireless terminal can no longer be received, terminates sounding of the alarm after a predetermined amount of time passes, and makes a transition to a lock standby state.

15 Claims, 5 Drawing Sheets

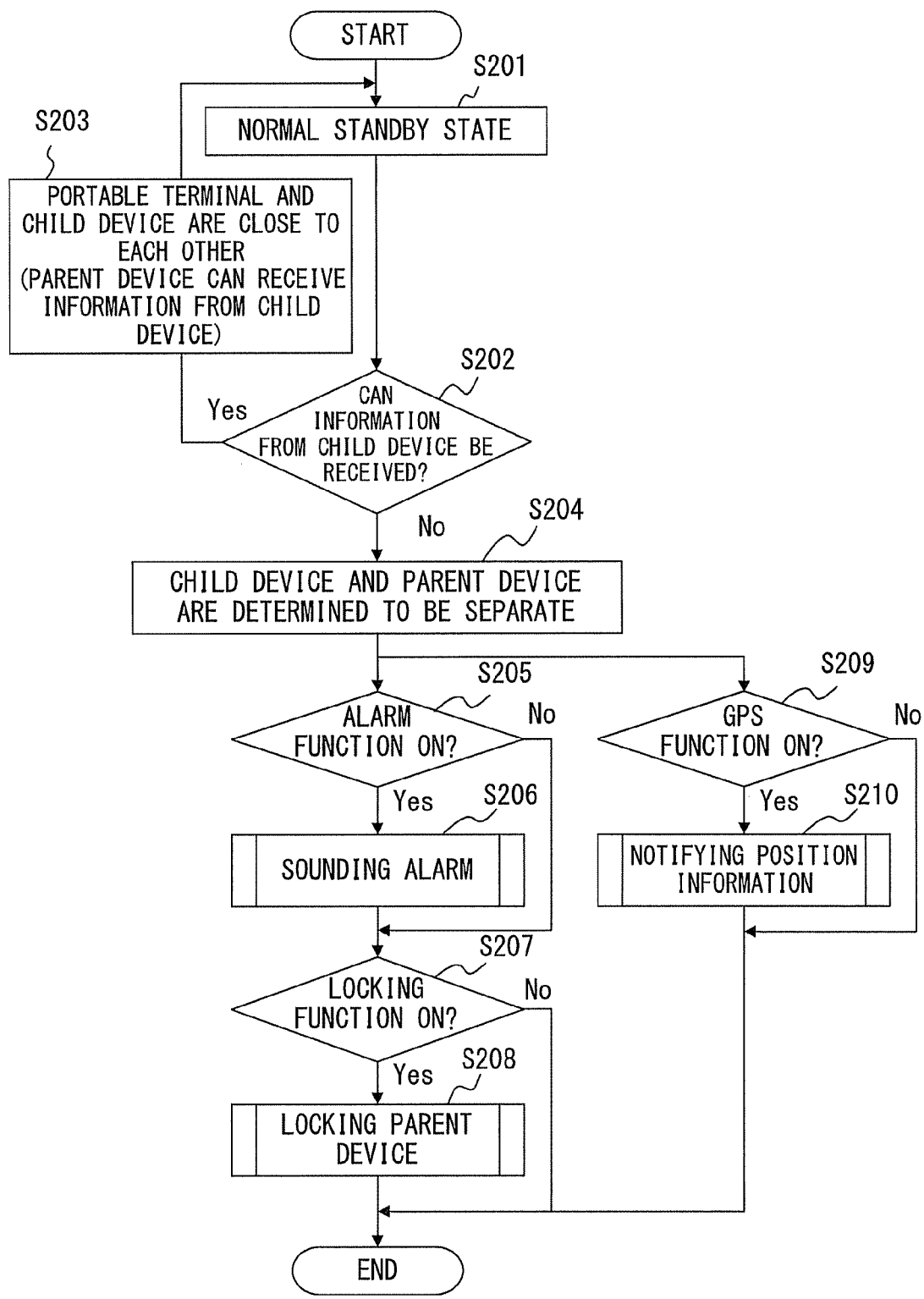
F I G. 2

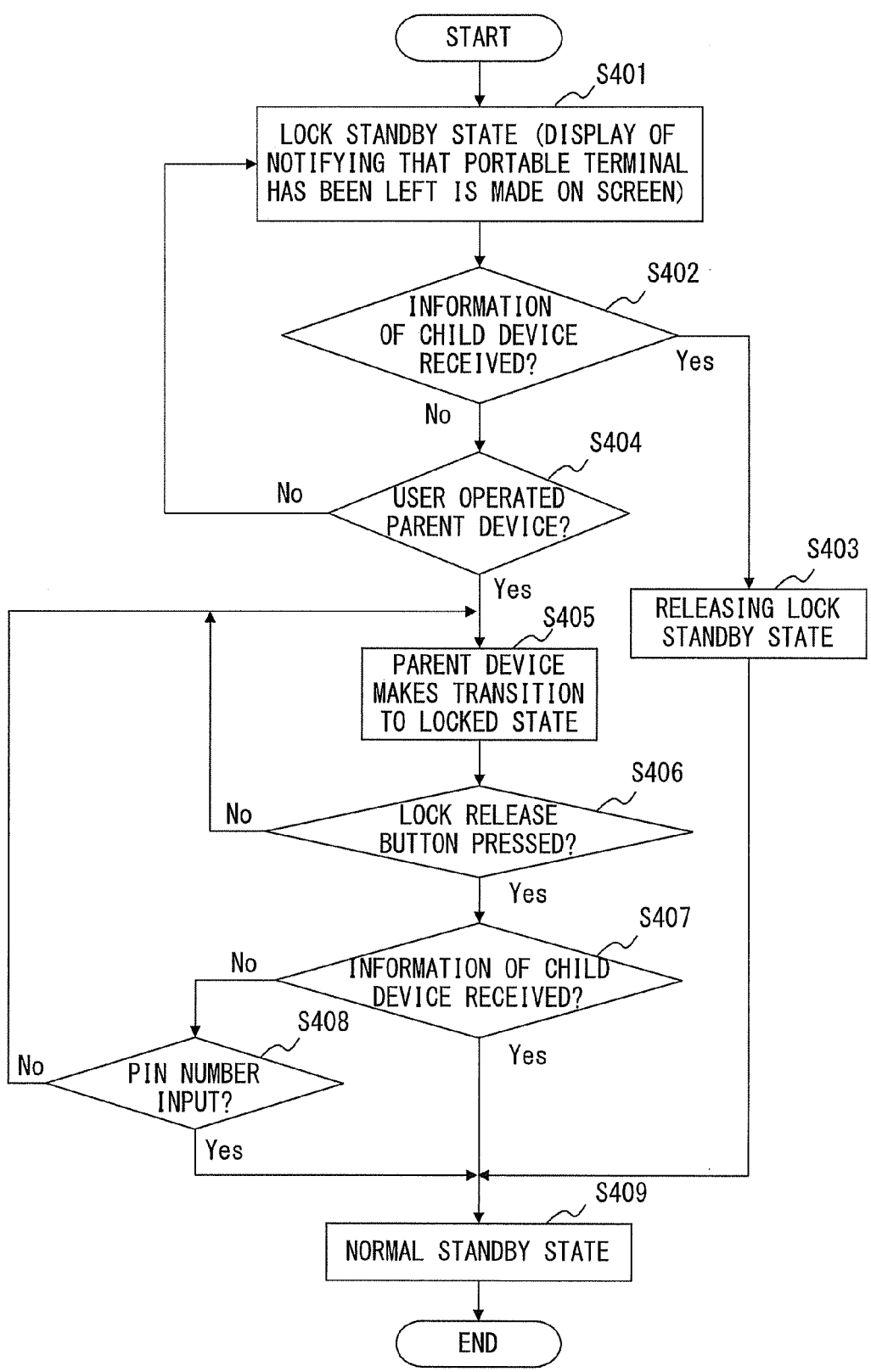
F I G. 4

SYSTEM AND METHOD FOR PREVENTING PORTABLE TERMINAL FROM BEING LEFT, AND PORTABLE TERMINAL

CROSS-REFERENCE TO RELATED APPLICATION

This application is a continuation of PCT application of PCT/JP2007/001188, which was filed on Oct. 30, 2007.

FIELD

The embodiments discussed herein are related to a system and a method for preventing a portable terminal from being left, and a portable terminal.

BACKGROUND

Personal information such as a telephone number, an e-mail address or the like is recorded to a portable terminal such as a cellular phone or the like. Moreover, portable terminals have been provided with credit card and electronic money functions resulting from recent enhancements of functions. Therefore, it is a serious issue that a portable terminal is left or stolen. Accordingly, it is proposed that a portable terminal is linked with another wireless device and position information of the portable terminal is transmitted to a predetermined communication destination if the portable terminal and the wireless device are separated from each other and the portable terminal is determined to be left.

Patent Document 1 discloses a mobile communication terminal that transmits its position information and restricts its functions when a signal from a communication terminal is no longer received.

However, a conventional portable terminal is locked the moment when a communication between the portable terminal and a child device becomes impossible. Therefore, the portable terminal is locked each time a user accidentally excessively separates from the portable terminal. As a result, the user has to release the locked terminal each time the portable terminal is locked, leading to heavy burdensomeness. Moreover, conventional technology only ensures security by locking a portable terminal when being left. Actually, it is necessary to prevent a portable terminal from being left.

Patent Document 1: Japanese Laid-open Patent Publication No. 2005-333626

SUMMARY

According to an aspect of the invention, a system for preventing a portable terminal from being left includes a wireless terminal including a transmitting unit, and a portable terminal including a receiving unit configured to receive a signal from the wireless terminal, an alarm sounding unit configured to sound an alarm, and a locking managing unit configured to restrict a function of the portable terminal. In this system, the alarm sounding unit sounds an alarm when the signal can no longer be received and terminates sounding of the alarm after a predetermined amount of time passes, and the locking managing unit causes the portable terminal to enter a lock standby state after the sounding of the alarm is terminated.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a flowchart illustrating a process of the system for preventing a portable terminal from being left according to the embodiment;

FIG. 4 is a flowchart illustrating the details of a locking process; and

DESCRIPTION OF EMBODIMENT

An embodiment according to the present invention is described with reference to the drawings.

Figure 1:
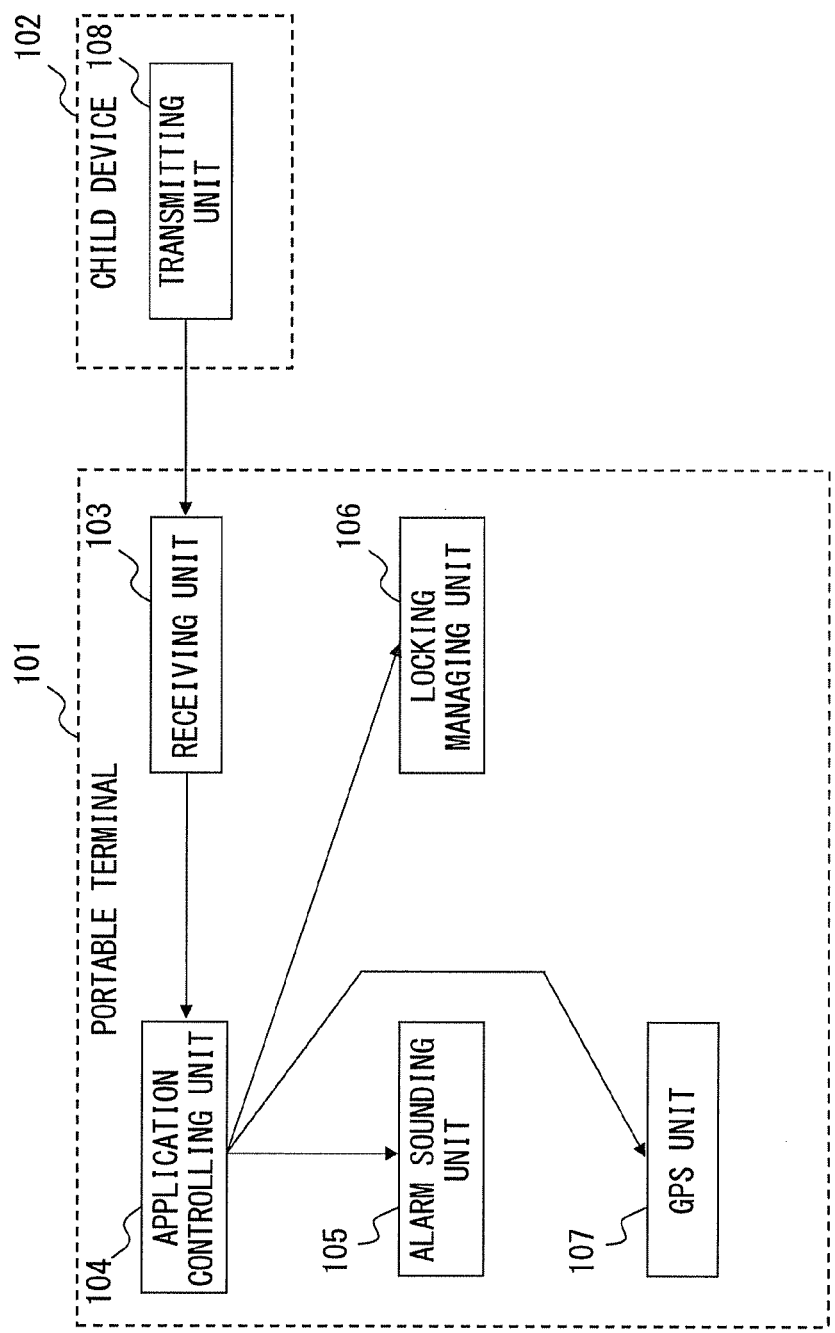
FIG. 1 is a block diagram illustrating a system for preventing a portable terminal from being left according to an embodiment.

FIG. 1 is a block diagram illustrating a system for preventing a portable terminal from being left according to the embodiment.

The system for preventing a portable terminal from being left according to the embodiment includes a portable terminal 101 and a child device 102. The portable terminal 101 is also referred to as a parent device.

The portable terminal 101 is connected to a mobile communication network via a base station (not illustrated). The portable terminal 101 may communicate with another portable terminal, a server, or an RNC (Radio Network Control: base station controlling device) via a base station.

For example, a cellular phone or a PHS (Personal Handyphone System) is used as the portable terminal.

The portable terminal 101 includes a receiving unit 103, an application controlling unit 104, an alarm sounding unit 105, a locking managing unit 106, and a GPS (Global Positioning System) unit 107.

The receiving unit 103 receives information from the child device 102 with a wireless communication.

The application controlling unit 104 executes various types of functions for preventing the portable terminal from being left.

The alarm sounding unit 105 executes a process for sounding an alarm.

The locking managing unit 106 executes a process for locking the portable terminal.

The GPS unit 107 executes a process such as position information obtainment or the like by using GPS.

The child device 102 is a wireless terminal having a short-distance wireless communication function. Normally, a user carries the child device 102. The child device 102 includes a transmitting unit 108, from which information is transmitted with a wireless communication. The information is transmitted at predetermined time intervals, for example, every three seconds. An ID and a state of the child device are transmitted as the information. In the system for preventing a portable terminal from being left according to the embodiment, the child device 102 makes a unidirectional communication with the portable terminal 101. Accordingly, it is possible to reduce power consumed by the portable terminal 101.

FIG. 2 is a flowchart illustrating a process of the system for preventing a portable terminal from being left according to the embodiment.

Initially, an ID of a child device, which corresponds to the ID of the child device 102 carried by a user, is preregistered to the portable terminal 101. Moreover, the user presets whether or not to use the alarm function, the locking function, and the GPS function of the portable terminal 101 when he or she has left the portable terminal 101.

In step S201, the application controlling unit 104 of the portable terminal 101 causes the portable terminal 101 to enter a normal standby state.

In step S202, the application controlling unit 104 checks whether or not the information can be received from the child device 102. If the information can be received, the process goes to step S203. If the information cannot be received, the process goes to step S204.

Whether or not the information can be received is determined, for example, by analyzing received information, and by making a comparison between an ID of a child device included in the received information and the ID of the child device registered to the portable terminal 101. If the IDs match, it is determined that the information can be received from the child device 102.

If a wireless communication cannot be made with the child device 102, it is determined that the information cannot be received.

Additionally, if the intensity of radio waves from the child device 102 is equal to or smaller than a predetermined value even though the information can be received and the IDs match, it may be determined that the information cannot be received.

In step S204, it is determined that the child device 102 and the portable terminal 101 have been separated from each other, and the process goes to steps S205 and S206. Processes in steps S205 to S208 and those in steps S209 to S210 are independently executed in parallel.

In step S205, the application controlling unit 104 checks whether or not the alarm function of the portable terminal 101 is ON. If the alarm function is ON, the process goes to step S206. If the alarm function is OFF, the process goes to step S207.

In step S206, the application controlling unit 104 executes an alarm sounding process. The alarm sounding process will be described in detail later.

In step S207, it is checked whether or not the locking function is ON. If the locking function is ON, the process goes to step S208. If the locking function is OFF, the process goes to step S207.

In step S208, the application controlling unit 104 causes the locking managing unit 106 to execute a locking process for locking the portable terminal 101. The locking process will be described in detail later.

In step S209, it is checked whether or not the GPS function is ON. If the GPS function is ON, the process goes to step S210. If the GPS function is OFF, this process is terminated.

In step S210, the application controlling unit 104 causes the GPS unit 107 to execute a position information notification process for notifying the GPS unit 107 of the position information of the portable terminal 101. The position information notification process will be described in detail later.

Figure 3:
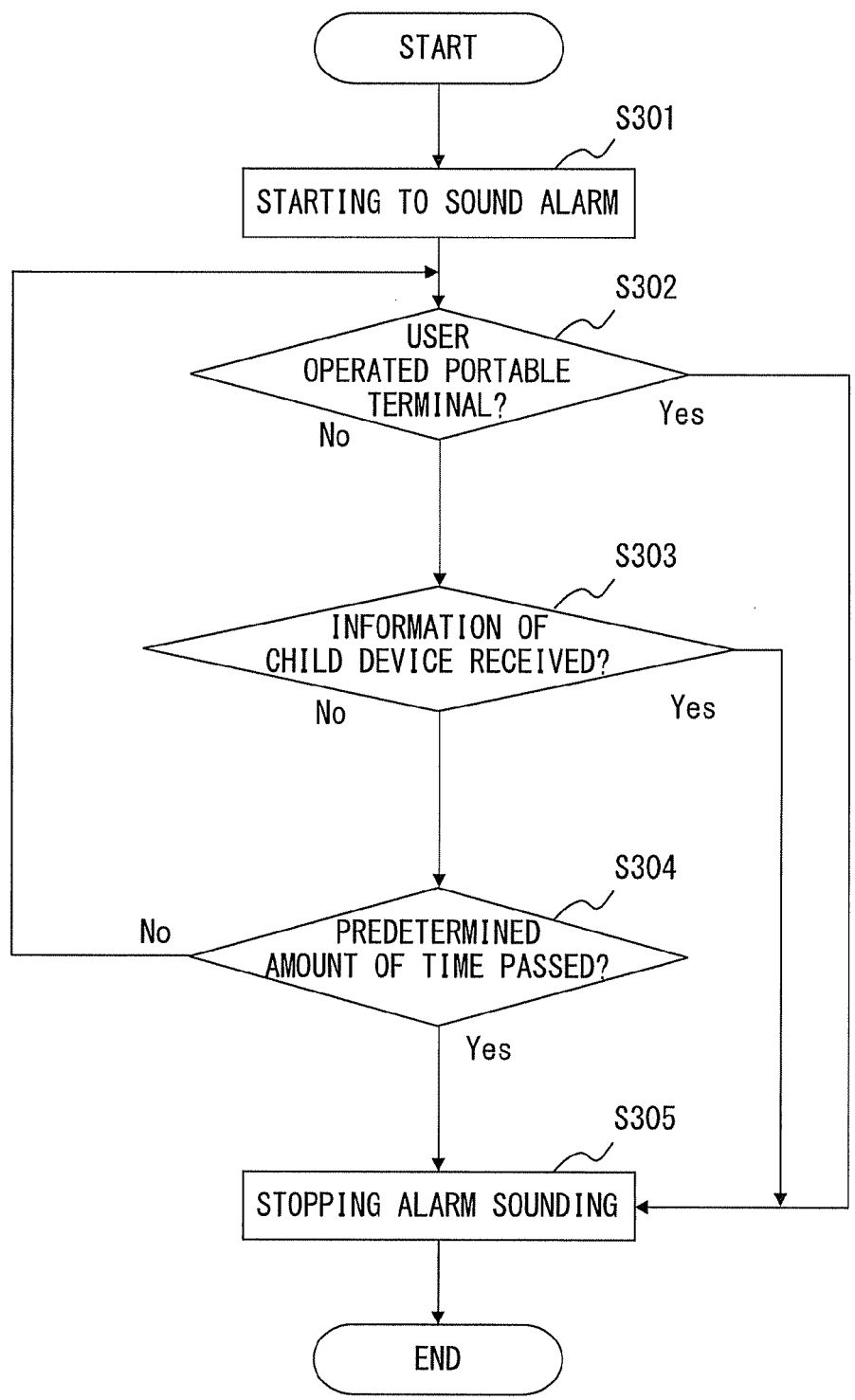
FIG. 3 is a flowchart illustrating the details of an alarm sounding process.

FIG. 3 is a flowchart illustrating the details of the alarm sounding process executed in step S205.

In step S301, the alarm sounding unit 105 starts to sound an alarm. As a result, a voice or warning beep is output from a speaker included in the portable terminal 101.

In step S302, it is checked whether or not the user has operated the portable terminal 101. For example, it is checked whether or not the user has pressed a button of the portable terminal 101. If the user has operated the portable terminal 101, the process goes to step S305. If the user has not operated the portable terminal 101, the process goes to step S303.

In step S303, it is checked whether or not the information of the child device 102 has been received. If the information has been received, the process goes to step S304. If the information has not been received, the process goes to step S305.

In step S304, it is checked whether or not a predetermined amount of time (predetermined duration) has passed since the alarm starts to sound. If the predetermined amount of time has passed, the process goes to step S305. If the predetermined amount of time has not passed, the process goes back to step S302.

In step S305, the application controlling unit 104 issues an instruction to stop sounding the alarm to the alarm sounding unit 105. As a result, the alarm sounding unit 105 stops sounding the alarm.

FIG. 4 is a flowchart illustrating the details of the locking process executed in step S207.

In step S401, the application controlling unit 104 causes the locking managing unit 106 to execute the locking process. The locking managing unit 106 causes the portable terminal 101 to enter a lock standby state. In the lock standby state, a display such that the portable terminal 101 has been left is made on a display unit of the portable terminal 101.

In step S402, it is checked whether or not the information of the child device has been received. If the information has been received, the process goes to step S403. If the information has not been received, the process goes to step S404.

In step S403, the lock standby state is released. Then, the process goes to step S409, in which the portable terminal 101 is caused to make a transition to the normal standby state.

In step S404, it is checked whether or not the user has operated the portable terminal 101. If the user has operated the portable terminal 101, the process goes to step S405. If the user has not operated the portable terminal 101, the process goes to step S401.

In step S405, the locking managing unit 106 locks the portable terminal 101, and causes the portable terminal 101 to make a transition to a locked state. In the locked state, functions such as a function to accept a key input, a function to make a display on the display unit, and the like, are suspended in the portable terminal 101, and functions other than functions preset by the user become unavailable.

In step S406, it is checked whether or not a lock release button of the portable terminal 101 has been pressed. If the button has been pressed, the process goes to step S407. If the button has not been pressed, the process goes back to step S405.

In step S407, it is checked whether or not the information of the child device has been received. If the information has been received, the user is considered to have pressed the lock release button. Therefore, the process goes to step S409, in which the portable terminal 101 is caused to make a transition to the standby state. If the information of the child device has not been received, the process goes to step S408. By using a particular button such as the lock release button or the like, it becomes possible to easily release the locked state only with a press of one button without performing a burdensome operation such as an input of a PIN number or the like.

In step S408, a display for prompting the user to input a PIN number is made on the display unit of the portable terminal 101, and it is checked whether or not the user has input the PIN number. The PIN number is preset by the user in the portable terminal 101. If the user has input the PIN number, the process goes to step S409. If the user has input an incorrect PIN number or has not input any number for a predetermined duration, the process goes back to step S405. By using a PIN number, it becomes possible to release the locked state even though the child device 102 becomes faulty or is lost.

In step S409, the locked state is released, and the portable terminal 101 is caused to make a transition to the normal standby state.

Figure 5:
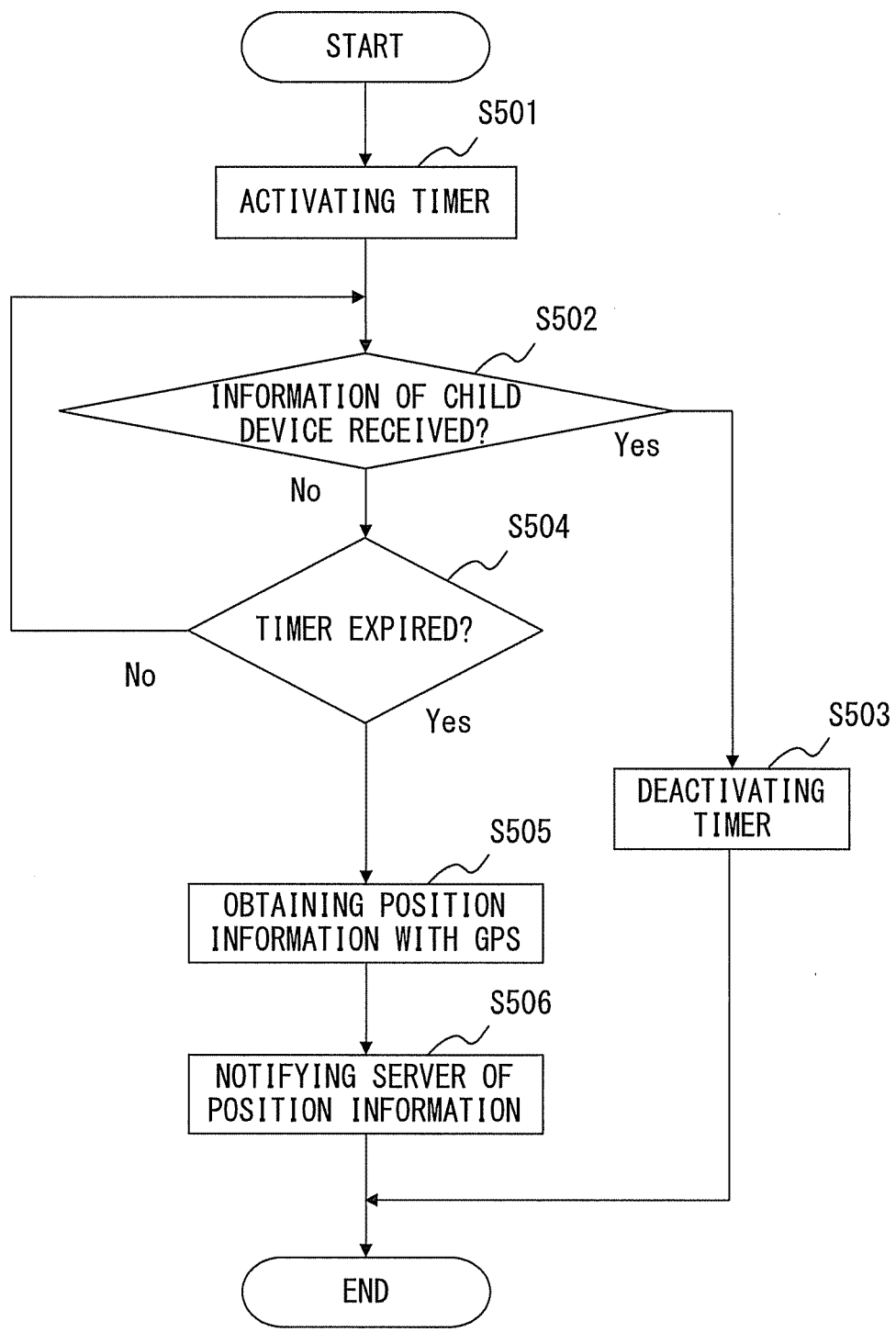
FIG. 5 is a flowchart illustrating the details of a position information notification process.

FIG. 5 is a flowchart illustrating the details of the GPS process executed in step S210.

In step S501, the application controlling unit 104 causes the GPS unit 107 to execute the position information notification process. The GPS unit 107 activates a timer to measure the passage of time.

In step S502, it is checked whether or not the information of the child device has been received. If the information has been received, the process goes to step S503. If the information has not been received, the process goes to step S504.

In step S503, the GPS 107 deactivates the timer.

In step S504, it is checked whether or not the timer has expired. If the timer has expired, the process goes to step S505. If the timer has not expired, the process goes to step S502. An expiration time of the timer is preset by the user in the portable terminal 101.

In step S505, the GPS unit 107 notifies the RNC that the GPS unit 107 itself executes the position information notification process. Then, the GPS unit 107 obtains, from a satellite, position information that indicates the position of the portable terminal 101 by using the GPS function of the portable terminal 101.

In step S506, the GPS unit 107 transmits the obtained position information to the RNC. The RNC notifies the received position information to a preset address specified as a transmission destination. In this embodiment, the position information is notified to the RNC. However, any server may be available as a replacement for the RNC as long as it has a function to notify the position information.

With the function to notify position information by using the GPS, the position of the portable terminal 101 can be learned even though the portable terminal 101 is lost. Moreover, the position information is notified after a state where the information of the child device 102 cannot be received continues for a predetermined duration. Therefore, the position information is prevented from being notified by user's coming back to a site of the portable terminal immediately even though he or she accidentally separates from the portable terminal 101. This leads to improvements in practicality and convenience.

With the system for preventing a portable terminal from being left according to this embodiment, a user who carries the child device 102 notices that he or she has left the portable terminal 101 by means of alarm sounding when he or she separates from the portable terminal 101, thereby enabling the user to prevent the portable terminal from leaving. Moreover, the portable terminal 101 is not locked at the time of alarm sounding. Therefore, even though the user accidentally separates from the portable terminal 101, he or she immediately comes back to the site of the portable terminal, thereby eliminating the need for releasing the locked state of the portable terminal 101 each time. As a result, convenience is improved.

The embodiment according to the present invention has been described up to this point. However, the present invention is not limited to the above described embodiment, and may take various configurations within a scope that does not depart from the gist of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. A system for preventing a portable terminal from being left, comprising:
   a wireless terminal including a transmitting unit; and
   a portable terminal including
      a receiving unit configured to receive a signal from the wireless terminal,
      an alarm sounding unit configured to sound an alarm, and
      a locking managing unit configured to restrict a function of the portable terminal, wherein
   the alarm sounding unit sounds an alarm when the signal can no longer be received, and terminates sounding of the alarm after a predetermined amount of time passes, and
   the locking managing unit causes the portable terminal to enter a lock standby state after the sounding of the alarm is terminated.

2. The system according to claim 1, wherein
   the locking managing unit releases the lock standby state when the signal can be received in the lock standby state.

3. The system according to claim 1, wherein
   the locking managing unit causes the portable terminal to enter a locked state when the portable terminal has been operated in the lock standby state.

4. The system according to claim 3, wherein
   the locking managing unit releases the locked state when a lock release button is pressed and the signal can be received in the locked state.

5. The system according to claim 1, wherein
   the portable terminal further includes a GPS unit configured to obtain position information of the portable terminal, wherein
   the GPS unit obtains the position information of the portable terminal and transmits the position information when a state where the signal cannot be received continues for a predetermined duration.

6. A method for preventing a portable terminal from being left, comprising:
   receiving a signal from a wireless terminal;
   determining whether or not the signal can be received;
   sounding an alarm when the signal cannot be received; and
   causing the portable terminal to enter a lock standby state after sounding of the alarm is terminated.

7. The method according to claim 6, further comprising releasing the lock standby state when the signal can be received in the lock standby state.

8. The method according to claim 6, further comprising causing the portable terminal to enter a locked state when the portable terminal has operated in the lock standby state.

9. The method according to claim 8, further comprising releasing the locked state when a lock release button is pressed and the signal can be received in the locked state.

10. The method according to claim 6, further comprising
obtaining position information of the portable terminal and transmitting the position information when a state where the signal cannot be received continues for a predetermined duration.

11. A portable terminal, comprising:
a receiving unit configured to receive a signal from a wireless terminal;
an alarm sounding unit configured to sound an alarm; and
a locking managing unit configured to restrict a function of the portable terminal, wherein
the alarm sounding unit sounds an alarm when the signal can no longer be received, and terminates sounding of the alarm after a predetermined amount of time passes, and
the locking managing unit causes the portable terminal to enter a lock standby state after the sounding of the alarm is terminated.

12. The portable terminal according to claim 11, wherein the locking managing unit releases the lock standby state when the signal can be received in the lock standby state.

13. The portable terminal according to claim 11, wherein the locking managing unit causes the portable terminal to enter a locked state when the portable terminal has been operated in the lock standby state.

14. The portable terminal according to claim 13, wherein the locking managing unit releases the locked state when a lock release button has been pressed and the signal can be received in the locked state.

15. The portable terminal according to claim 11, further comprising
a GPS unit configured to obtain position information of the portable terminal, wherein
the GPS unit obtains the position information of the portable terminal and transmits the position information when a state where the signal cannot be received continues for a predetermined duration.

* * * * *